(12) United States Patent
Abou Mahmoud et al.

(10) Patent No.: US 10,621,286 B2
(45) Date of Patent: Apr. 14, 2020

(54) DETERMINING THE USER'S CURRENT PREFERRED MANNER IN COMMUNICATING WITH USER

(71) Applicant: International Business Machines Corporation, Armonk, NY (US)

(72) Inventors: Alaa Abou Mahmoud, Dracut, MA (US); Paul R. Bastide, Boxford, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/802,111

(22) Filed: Nov. 2, 2017

(65) Prior Publication Data
US 2018/0143969 A1    May 24, 2018

Related U.S. Application Data

(63) Continuation of application No. 15/237,857, filed on Aug. 16, 2016.

(51) Int. Cl.
*H04L 29/08*    (2006.01)
*G06F 3/0484*    (2013.01)
(Continued)

(52) U.S. Cl.
CPC ........ *G06F 17/279* (2013.01); *G06F 3/04845* (2013.01); *H04L 43/16* (2013.01);
(Continued)

(58) Field of Classification Search
CPC ...... H04L 51/24; H04L 51/38; H04M 3/5307; H04M 3/537; G06F 3/04845; G06F 3/0484
(Continued)

(56) References Cited

U.S. PATENT DOCUMENTS 10,187,334 B2    1/2019 Hullfish et al.
2005/0018820 A1*   1/2005 Chaddha ................. H04L 51/24
                                                                 379/88.13
(Continued)

FOREIGN PATENT DOCUMENTS

EP    2894576 A1    7/2015
WO    2012136879 A1    10/2012
WO    2013123998 A1    8/2013

OTHER PUBLICATIONS

Office Action for U.S. Appl. No. 15/237,857 dated Mar. 6, 2019, pp. 1-20.
(Continued)

*Primary Examiner* — Akwasi M Sarpong
(74) *Attorney, Agent, or Firm* — Robert A. Voigt, Jr.; Winstead PC

(57) ABSTRACT

A method, system and computer program product for suggesting a preferred manner in communicating with a user. Communications (e.g., electronic mail messages, instant messages, social media posts) with a user from a plurality of other users and responses thereto are monitored. A communication history is then created storing the monitored communications and responses thereto. The communication history is then analyzed to determine a preferred manner in communicating with the user based on various factors (e.g., the types of communications and responses thereto, the times of communications and responses thereto, the topics of communications and responses thereto). In one embodiment, such an analysis utilizes natural language processing and sentiment analysis. In this manner, the user will be contacted in the appropriate way thereby allowing the user to avoid potential interruptions and increase the user's productivity as well as to address matters (e.g., urgent matters) appropriately.

7 Claims, 3 Drawing Sheets

(51) Int. Cl.
*H04L 12/58* (2006.01)
*H04L 12/26* (2006.01)
*G06F 17/27* (2006.01)

(52) U.S. Cl.
CPC .............. *H04L 51/16* (2013.01); *H04L 67/22* (2013.01); *H04L 67/306* (2013.01)

(58) Field of Classification Search
USPC ........................................... 704/9, 8; 702/62
See application file for complete search history.

(56) References Cited

U.S. PATENT DOCUMENTS

| | | | |
|---|---|---|---|
| 2009/0274286 A1* | 11/2009 | O'Shaughnessy | H04M 1/72547 379/201.12 |
| 2013/0095865 A1 | 4/2013 | Roets | |
| 2013/0117296 A1* | 5/2013 | Mizuguchi | G06F 16/24 707/758 |
| 2013/0191319 A1 | 7/2013 | Biehl et al. | |
| 2014/0006591 A1 | 1/2014 | Davis | |
| 2014/0258503 A1* | 9/2014 | Tong | H04L 12/1827 709/224 |
| 2014/0351352 A1* | 11/2014 | Degaugue | H04L 51/16 709/206 |
| 2014/0359026 A1 | 12/2014 | Lefor et al. | |
| 2016/0044186 A1* | 2/2016 | Inoue | H04N 1/00209 358/1.15 |

OTHER PUBLICATIONS

Office Action for U.S. Appl. No. 15/237,857 dated Sep. 10, 2018, pp. 1-24.

List of IBM Patents or Patent Applications Treated as Related, Nov. 2, 2017, pp. 1-2.

Urabe et al., "Comparison of Emoticon Recommendation Methods to Improve Computer-Mediated Communication," Recommendation and Search in Social Networks, Springer International Publishing, 2015, pp. 23-39.

List of IBM Patents or Patent Applications Treated as Related, Jul. 22, 2019, pp. 1-2.

Office Action for U.S. Appl. No. 16/509,784 dated Oct. 25, 2019, pp. 1-43.

* cited by examiner

DETERMINING THE USER'S CURRENT PREFERRED MANNER IN COMMUNICATING WITH USER

TECHNICAL FIELD

The present invention relates generally to communications, and more particularly to determining the user's current preferred manner in communicating with the user.

BACKGROUND

There are many different ways to communicate with a user, such as via e-mail, a telephone call, text messaging, instant messaging, social media posts, etc. However, some users have a preferred way to be contacted, such as based on their work style, traveling schedule, working hours, etc. For instance, a user may prefer to be contacted via e-mail as opposed to being contacted by a telephone call or instant messaging during work hours as they do not want to be interrupted to reduce their productivity, especially if the user is in a meeting or delivering a presentation. Other users may instead prefer being contacted via a telephone call since issues can be addressed much faster.

At times though, the user's preferred manner in contacting the user is not followed. For example, the user could be in a meeting delivering a presentation. If the user's preferred manner in communicating with the user (e.g., only via e-mail) is not followed during the meeting, then undesirable results may occur. For instance, if the user is screen sharing with customers during the meeting and the user receives an instant message with confidential information from a colleague during the meeting, then such confidential information may be disclosed to people outside the user's company.

Currently, the user may indicate the user's preferred manner in contacting the user, such as via the user's social networking profile. However, the contact method indicated in the profile may not be accurate. It may not take into consideration the user's current situation (e.g., in a meeting) or the reasons (e.g., urgent matter) as to why someone is contacting the user. For example, if a person is contacting the user concerning an urgent matter, the user may not be able to respond as quickly as desired if the person contacted the user by e-mail as opposed to a text message.

As a result, it is important to determine the user's current preferred manner in communicating with the user so as to indicate the appropriate contact method to avoid interruptions and increase the user's productivity as well as to address matters (e.g., urgent matters) appropriately.

SUMMARY

In one embodiment of the present invention, a method for suggesting a preferred manner in communicating with a user comprises monitoring communications with the user from a plurality of other users and responses thereto. The method further comprises creating a communication history storing the monitored communications and responses thereto. The method additionally comprises analyzing, by a processor, the communication history to determine a preferred manner in communicating with the user based on types of the communications and responses thereto, times of the communications and responses thereto and topics of the communications and responses thereto.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for suggesting a preferred manner in communicating with a user. In one embodiment of the present invention, communications (e.g., phone calls, electronic mail messages, instant messages, short message service message, social media posts) with a user from a plurality of other users and responses thereto are monitored. A communication history is then created storing the monitored communications and responses thereto. The communication history is then analyzed to determine a preferred manner in communicating with the user based on one or more of the following: the types of communications and responses thereto, the urgency of the communications and responses thereto, the times of communications and responses thereto, the topics of communications and responses thereto, the frequency of communications and responses thereto, the schedule of the user at the time of the responses as well as the user availability at the time of the responses. In one embodiment, such an analysis utilizes natural language processing and sentiment analysis. In this manner, the user will be contacted in the appropriate way thereby allowing the user to avoid potential interruptions and increase the user's productivity as well as to address matters (e.g., urgent matters) appropriately.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
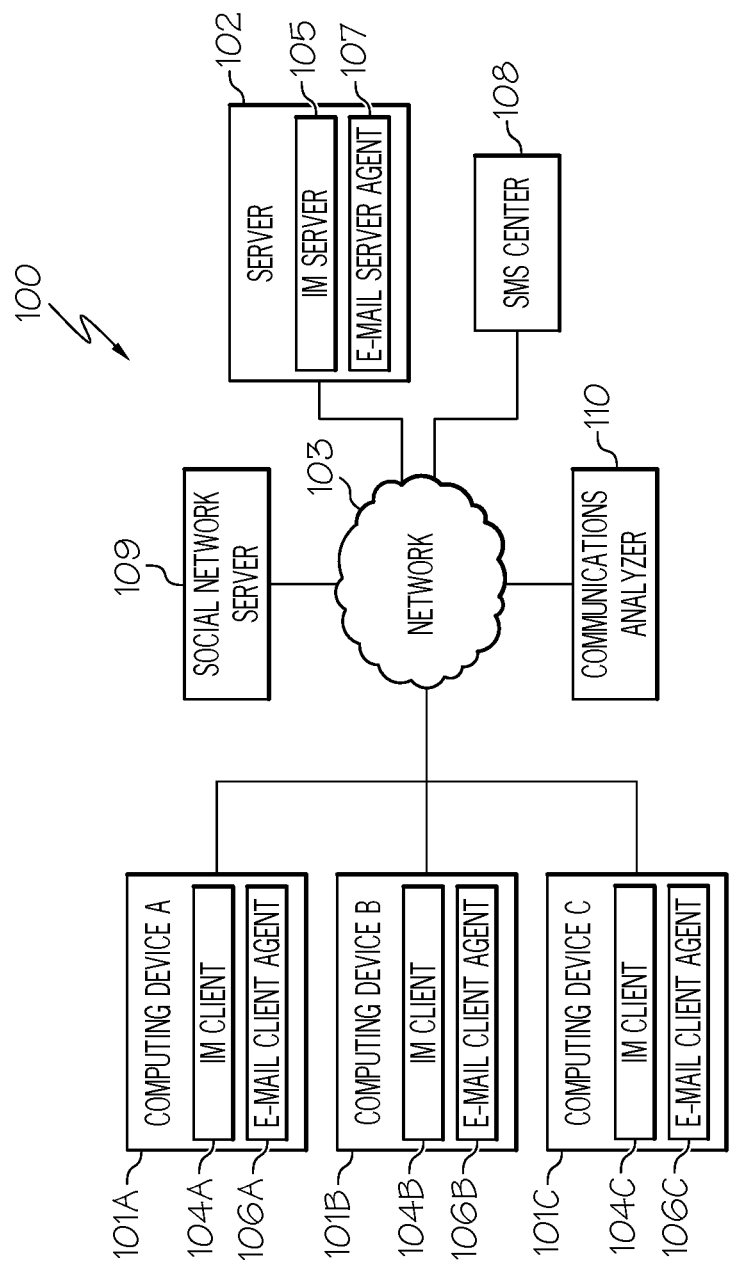
FIG. 1 illustrates an embodiment of the present invention of a communication system configured in accordance with an embodiment of the present invention.

Referring now to the Figures in detail, FIG. 1 illustrates an embodiment of the present invention of a communication system 100 for practicing the principles of the present invention in accordance with an embodiment of the present invention. Communication system 100 includes computing devices 101A-101C (identified as "Computing Device A," "Computing Device B," and "Computing Device C," respectively, in FIG. 1) connected to a server 102 via a network 103. Computing devices 101A-101C may collectively or individually be referred to as computing devices 101 or computing device 101, respectively. It is noted that both computing devices 101 and the users of computing devices 101 may be identified with element number 101.

Computing device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other computing devices 101 and server 102.

Computing devices 101 may be configured to send and receive text-based messages in real-time during an instant messaging session. Any user of computing devices 101 may be the creator or initiator of an instant message (message in instant messaging) and any user of computing devices 101 may be a recipient of an instant message. Furthermore, any user of computing devices 101 may be able to create, receive and send e-mails. Additionally, any user of computing devices 101 may be able to send and receive text messages, such as Short Message Services (SMS) messages. In addition, any user of computing devices 101 (e.g., mobile phone) may be capable of initiating or receiving a telephone call over network 103 (e.g., circuit-switched telephone network, Wi-Fi network, an IEEE 802.11 standards network).

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In communication system 100, computing devices 101A-101C may include a software agent, referred to herein as the Instant Messaging (IM) client 104A-104C, respectively. Instant messaging clients 104A-104C may collectively or individually be referred to as instant messaging clients 104 or instant messaging client 104, respectively. Furthermore, server 102 may include a software agent, referred to herein as the Instant Messaging (IM) server 105. IM client 104 provides the functionality to send and receive instant messages. As messages are received, IM client 104 presents the messages to the user in a dialog window (or IM window). Furthermore, IM client 104 provides the functionality for computing device 101 to connect to the IM server 105 which provides the functionality of distributing the instant messages to the IM clients 104 associated with each of the sharing users.

Computing device 101A-101C may further include a software agent, referred to herein as the e-mail client agent 106A-106C, respectively. E-mail client agents 106A-106C may collectively or individually be referred to as e-mail client agents 106 or e-mail client agent 106, respectively. Furthermore, server 102 may include a software agent, referred to herein as the e-mail server agent 107. E-mail client agent 106 enables the user of computing device 101 to create, send and receive e-mails. E-mail server agent 107 is configured to receive e-mail messages from computing device 101 and distribute the received e-mail messages among the one or more computing devices 101.

While the preceding discusses each computing device 101 as including an IM client 104 and an e-mail client agent 106, each computing device 101 may not necessarily include each of these software agents. Furthermore, while the preceding discusses a single server 102 including the software agents, such as IM server 105 and e-mail server agent 107, multiple servers may be used to implement these services. Furthermore, each server 102 may not necessarily be configured to include all of these software agents, but only a subset of these software agents.

System 100 further includes a Short Message Service (SMC) center 108 configured to relay, store and forward text messages, such as SMS messages, among computing devices 101 through network 103.

System 100 further includes a social network server 109, which may be a web server configured to offer a social networking and/or microblogging service, enabling users of computing devices 101 to send and read other users' posts. "Posts," as used herein, include any one or more of the following: text (e.g., comments, sub-comments and replies), audio, video images, etc. Social network server 109 is connected to network 103 by wire or wirelessly. While FIG. 1 illustrates a single social network server 109, it is noted for clarity that multiple servers may be used to implement the social networking and/or microblogging service.

System 100 further includes a unit 110, referred to herein as the "communications analyzer," connected to network 103 via wire or wirelessly. Communications analyzer 110 is configured to analyze monitored communications between a user 101 and other users 101 and the responses thereto as well as determine the current preferred manner in communicating with user 101 as discussed further below in connection with FIG. 3. By determining the current preferred manner in communicating with user 101, the appropriate contact method may be used so as to avoid interruptions, increase the user's productivity as well as to address matters (e.g., urgent matters) appropriately. A description of the hardware configuration of communications analyzer 110 is provided below in connection with FIG. 2.

System 100 is not to be limited in scope to any one particular network architecture. System 100 may include any number of computing devices 101, servers 102, networks 103, SMS centers 108, social network servers 109 and communications analyzers 110.

Figure 2:
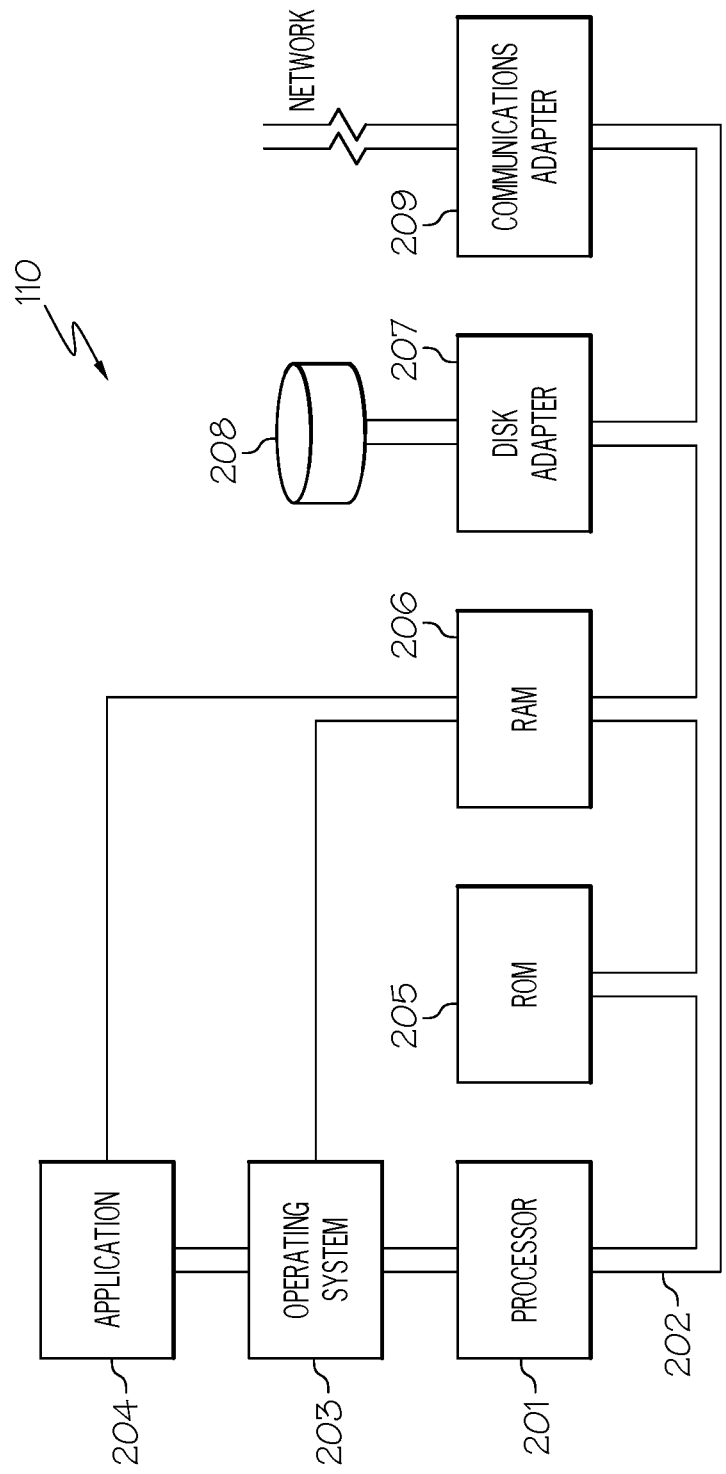
FIG. 2 illustrates an embodiment of the present invention of a hardware configuration of a communications analyzer configured in accordance with an embodiment of the present invention.

Referring now to FIG. 2, FIG. 2 illustrates an embodiment of the present invention of a hardware configuration of communications analyzer 110 (FIG. 1), which is representative of a hardware environment for practicing the present invention. Referring to FIG. 2, communications analyzer 110 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, voice recognition software for recognizing and translating spoken language in a phone call to text so as to analyze the text using natural language processing and sentiment analysis; and a program for suggesting a preferred manner in communicating with user 101 (FIG. 1) as discussed further below in connection with FIG. 3.

Referring again to FIG. 2, read-only memory ("ROM") 205 is coupled to system bus 202 and includes a basic input/output system ("BIOS") that controls certain basic functions of communications analyzer 110. Random access memory ("RAM") 206 and disk adapter 207 are also coupled to system bus 202. It should be noted that software components including operating system 203 and application 204 may be loaded into RAM 206, which may be communications analyzer's 110 main memory for execution. Disk adapter 207 may be an integrated drive electronics ("IDE") adapter that communicates with a disk unit 208, e.g., disk drive. It is noted that the program for suggesting a preferred manner in communicating with user 101, as discussed further below in connection with FIG. 3, may reside in disk unit 208 or in application 204.

Communications analyzer 110 may further include a communications adapter 209 coupled to bus 202. Communications adapter 209 interconnects bus 202 with an outside network (e.g., network 103 of FIG. 1) thereby allowing communications analyzer 110 to communicate with devices, such as computing devices 101, servers 102, SMS centers 108 and social network servers 109.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, there are many different ways to communicate with a user, such as via e-mail, a telephone call, text messaging, instant messaging, social media posts, etc. However, some users have a preferred way to be contacted, such as based on their work style, traveling schedule, working hours, etc. For instance, a user may prefer to be contacted via e-mail as opposed to being contacted by a telephone call or instant messaging during work hours as they do not want to be interrupted to reduce their productivity, especially if the user is in a meeting or delivering a presentation. Other users may instead prefer being contacted via a telephone call since issues can be addressed much faster. At times though, the user's preferred manner in contacting the user is not followed. For example, the user could be in a meeting delivering a presentation. If the user's preferred manner in communicating with the user (e.g., only via e-mail) is not followed during the meeting, then undesirable results may occur. For instance, if the user is screen sharing with customers during the meeting and the user receives an instant message with confidential information from a colleague during the meeting, then such confidential information may be disclosed to people outside the user's company. Currently, the user may indicate the user's preferred manner in contacting the user, such as via the user's social networking profile. However, the contact method indicated in the profile may not be accurate. It may not take into consideration the user's current situation (e.g., in a meeting) or the reasons (e.g., urgent matter) as to why someone is contacting the user. For example, if a person is contacting the user concerning an urgent matter, the user may not be able to respond as quickly as desired if the person contacted the user by e-mail as opposed to a text message. As a result, it is important to determine the user's current preferred manner in communicating with the user so as to indicate the appropriate contact method to avoid interruptions and increase the user's productivity as well as to address matters (e.g., urgent matters) appropriately.

The principles of the present invention provide a means for determining and suggesting to the user the user's current preferred manner in communicating with the user so as to indicate the appropriate contact method to avoid interruptions, increase the user's productivity as well as to address matters (e.g., urgent matters) appropriately as discussed below in connection with FIG. 3.

Figure 3:
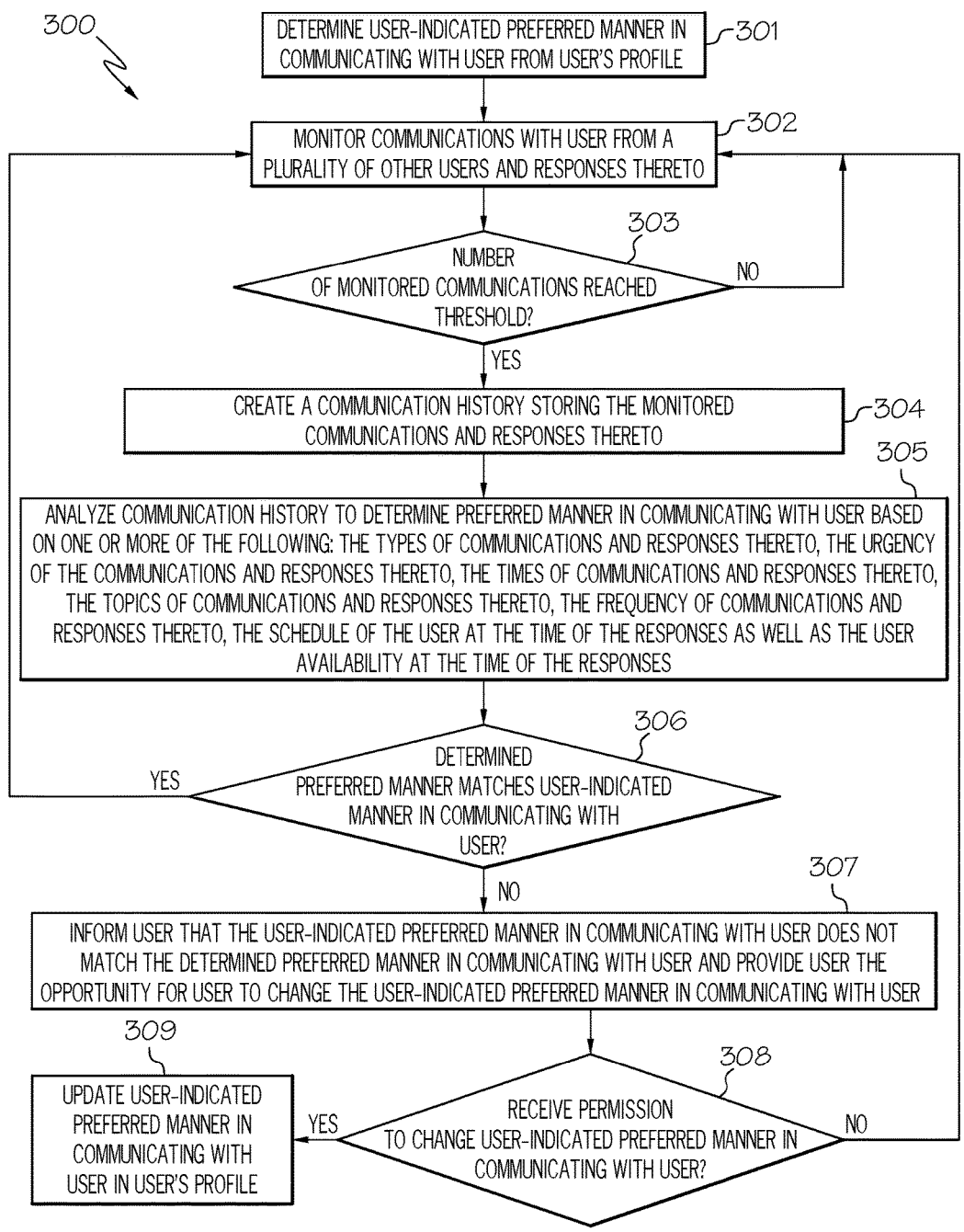
FIG. 3 is a flowchart of a method for determining and suggesting to the user a preferred manner in communicating with the user in accordance with an embodiment of the present invention.

FIG. 3 is a flowchart of a method 300 for determining and suggesting to user 101 (FIG. 1) a preferred manner in communicating with user 101 in accordance with an embodiment of the present invention.

Referring to FIG. 3, in conjunction with FIGS. 1-2, in step 301, communications analyzer 110 determines the user-indicated preferred manner in communicating with user 101, such as from a user's profile (e.g., social networking profile).

In step 302, communications analyzer 110 monitors communications (e.g., phone calls, electronic mail messages, instant messages, short message service message, social media posts) with user 101 (e.g., user 101A) from a plurality of other users 101 (e.g., users 101B, 101C) and responses thereto. For example, communications analyzer 110 monitors e-mail messages sent to user 101A from users 101B, 101C as well as user's 101A responses to these messages.

In step 303, a determination is made by communications analyzer 110 as to whether the number of monitored communications has reached a threshold (e.g., threshold number of communications, threshold number of people have contacted this user 101, threshold number of people have contacted this user 101 via one or more communication methods). For example, the threshold may be whether a particular number of people have contacted this user 101 by instant messaging as opposed to e-mail by 4:00 pm. In one embodiment, the threshold is user-selected.

If the number of monitored communications has not reached the threshold, then communications analyzer 110 continues to monitor communications with user 101 (e.g., user 101A) from a plurality of other users 101 (e.g., users 101B, 101C) and responses thereto in step 302.

If, however, the number of monitored communications has reached the threshold, then, in step 304, communications analyzer 110 creates a communication history storing the monitored communications and responses thereto.

In step 305, communications analyzer 110 analyzes the communication history to determine the preferred manner in communicating with user 101 (e.g., user 101A.). In one embodiment, the communication history may be analyzed to determine the preferred manner in communicating with user 101 based on one or more of the following: the types of communications and responses thereto, the urgency of the communications and responses thereto, the times of communications and responses thereto, the topics of communications and responses thereto, the frequency of communications and responses thereto, the schedule of the user at the time of the responses as well as the user availability at the time of the responses. In one embodiment, such an analysis utilizes natural language processing and sentiment analysis.

For example, user 101 may have indicated that user 101 prefers to be contacted via e-mail; however, when people have contacted user 101 using instant messaging or phone calls to discuss an urgent customer issue that needs to be resolved quickly, user 101 responds in the same manner without requesting to change the contact method. Hence, it may be deduced that for urgent matters, user 101 prefers to be contacted using instant messaging or phone calls as opposed to the user-indicated contact method of e-mail. In one embodiment, communications analyzer 110 may determine that a response to a communication involves an urgent matter using natural language processing. For example, communications analyzer 110 may utilize natural language processing to identify keywords (e.g., "urgent" indicated in the text of the communication) in the communication received by user 101. Furthermore, communications analyzer 110 may determine that user 101 has not requested to change the contact method in a response to a communication message by not identifying certain keywords (e.g., "change," "please e-mail me instead") using natural language processing when analyzing the response to these messages. As discussed above, application 204 of communications analyzer 110 may include voice recognition software that recognizes and translates the spoken language in a phone call to text (transcript) so as to enable communications analyzer 110 to analyze the text using natural language processing and sentiment analysis. As a result, communications analyzer 110 may have the ability to analyze phone calls as well as other forms of communications as discussed herein.

In another example, user 101 may respond to an e-mail message indicating that user 101 prefers to be contacted via instant messaging. Communications analyzer 101 may determine such a preference by user 101 using sentiment analysis to determine the attitude of user 101 with respect to being contacted in a particular manner. For instance, if user 101 used the phrase "prefer to be contacted by," then such a phrase may indicate that user 101 prefers to be contacted in a different manner than the manner in which user 101 was contacted.

In another example, the determined preferred manner in communicating with user 101 may be based on the time of day of the communications/responses. For example, user 101 may respond to all types of communications (e.g., e-mails, instant messages, phone calls) by e-mail during the work day. As a result, it may be deduced that the user prefers to be contacted via e-mail during the work day.

In a further example, the determined preferred manner in communicating with user 101 may be based on the topics of the communications/responses. In one embodiment, communications analyzer 110 may determine the topic of a communication/response using natural language processing by identifying keywords (e.g., sports, travel) in the communication/response. Based on the topic of the communication/response, it may be determined that user 101 prefers to receive communications in a certain manner for certain topics. For example, user 101 may respond via e-mail for work-related topics and hence, it may be deduced, that user 101 also prefers to receive communications related to work-related topics via e-mail. In another example, user 101 may respond via instant messaging involving the topic of the user's children. As a result, it may be inferred that user 101 prefers to receive communications via instant messaging involving the topic of the user's children.

In another example, the determined preferred manner in communicating with user 101 may be based on the frequency of communications and responses thereto. For instance, communications analyzer 110 may determine when user 101 receives over a certain number of instant messages that user 101 responds to such communications via e-mail. Hence, it may be deduced that user 101 prefers to only receive e-mails when user 101 receives a high number of communications.

In another example, the determined preferred manner in communicating with user 101 may be based on the schedule of the user at the time of the responses. For example, communications analyzer 110 may have access to the user's calendaring software which indicates times of meetings, vacations, etc. Based on such information, it may be determined that user 101 prefers to receive communications of a particular type based on the responses to communications during those times of meetings, vacations, etc. indicated in the user's calendar. For instance, communications analyzer 110 may determine that user 101 only e-mails during those times blocked off for vacation no matter whether the user 101 receives an e-mail, an instant message or a voice message (e.g., voice message generated in a waveform audio file format). Hence, it may be deduced that user 101 prefers to be contacted via e-mail during vacation.

In a further example, the determined preferred manner in communicating with user 101 may be based on the user availability at the time of the responses. For instance, as discussed above, communications analyzer 110 may have access to the user's calendaring software which indicates available times. Based on such information, it may be determined that user 101 prefers to receive communications of a particular type based on the responses to communications during those times of availability.

In another example, communications analyzer 110 may determine that user 101 prefers to receive communications of a particular type during times of availability by using natural language processing to analyze the responses (e.g., analyze text in an electronic mail message, analyze transcript generated from voice communication translated by voice recognition software). For instance, communications analyzer 110 may utilize natural language processing to identify keywords (e.g., "prefer to be contacted by e-mail") that may indicate that the user has a preference in the manner of being contacted during those times of availability, where those times of availability may be directly indicated in the response (e.g., "please feel free to call me when I am available which is between 2:00 pm-4:00 pm during the work week") or as indicated in the user's calendaring software.

In step 306, a determination is made by communications analyzer 110 as to whether the determined preferred manner (e.g., prefers to receive communications regarding urgent matters via instant messaging or phone) in communicating with user 101 (preferred manner determined in step 305) matches the user-indicated manner (e.g., user 101 indicated to be contacted via e-mail in the social networking profile) in communicating with user 101 (user-indicated manner in communicating with user 101 obtained in step 301).

If the determined preferred manner in communicating with user 101 matches the user-indicated manner in communicating with user 101, then communications analyzer 110 continues to monitor communications with user 101 (e.g., user 101A) from a plurality of other users 101 (e.g., users 101B, 101C) and responses thereto in step 302.

If, however, the determined preferred manner in communicating with user 101 does not match the user-indicated manner in communicating with user 101, then, in step 307, communications analyzer 110 informs user 101 that the user-indicated preferred manner in communicating with user 101 does not match the determined preferred manner in communicating with user 101 and provides user 101 with the opportunity for user 101 to change the user-indicated preferred manner in communicating with user 101, such as by updating the social networking profile.

For example, user 101 may have indicated that user 101 prefers to be contacted via e-mail in the user' profile; however, communications analyzer 110 has determined that for urgent matters, user 101 prefers to be contacted via text messaging. As a result, communications analyzer 110 will inform user 101 that user 101 may want to update the user-indicated manner in contacting user 101 as shown in the user's profile, such as by indicating to be contacted via text messaging for urgent matters.

In this manner, the user will be contacted in the appropriate way thereby allowing the user to avoid potential interruptions, increase the user's productivity as well as to address matters (e.g., urgent matters) appropriately. Suggesting the preferred manner in communicating with the user in such a manner is a non-conventional way. By using computing technology to determine the current preferred manner in communicating with the user, the user will more likely receive communications in the form as desired thereby avoiding potential interruptions, increasing the user's productivity as well as addressing matters (e.g., urgent matters) appropriately.

Referring to FIG. 3, in step 308, a determination is made by communications analyzer 110 as to whether it received permission from user 101 to change the user-indicated preferred manner in communicating with user 101, such as in the user's profile.

If communications analyzer 110 did not receive permission from user 101 to change the user-indicated preferred manner in communicating with user 101, then communications analyzer 110 continues to monitor communications with user 101 (e.g., user 101A) from a plurality of other users 101 (e.g., users 101B, 101C) and responses thereto in step 302.

If, however, communications analyzer 110 received permission from user 101 to change the user-indicated preferred manner in communicating with user 101, then, in step 309, communications analyzer 110 updates the user-indicated preferred manner in communicating with user 101, such as in the profile of user 101, with the determined preferred manner in communicating with user (obtained in step 305).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for suggesting a preferred manner in communicating with a user, the method comprising:

determining a user-indicated preferred manner in communicating with said user from a social networking profile of said user;

monitoring communications with said user from a plurality of other users and responses thereto, wherein said communications comprise phone calls, electronic mail messages, instant messages, short message service messages and social network posts;

creating a communication history storing said monitored communications and responses thereto in response to a number of said monitored communications reaching a threshold, wherein said threshold comprises a threshold number of people have contacted said user via one or more communication methods;

analyzing, by a processor, said communication history to determine a preferred manner in communicating with said user based on types of said communications and responses thereto, times of said communications and responses thereto, urgency of said communications and responses thereto, topics of said communications and responses thereto, a frequency of said communications and responses thereto, a schedule of said user at a time of said responses and user availability at said time of said responses;

determining whether said determined preferred manner in communicating with said user matches said user-indicated preferred manner in communicating with said user; and informing said user that said determined preferred manner in communicating with said user does not match said user-indicated preferred manner in communicating with said user and providing said user an opportunity for said user to change said user-indicated preferred manner in communicating with said user by updating said social networking profile in response to determining that said determined preferred manner in communicating with said user does not match said user-indicated preferred manner in communicating with said user thereby allowing said user to avoid potential interruptions, increase productivity of said user as well as to address matters appropriately.

2. The method as recited in claim 1 further comprising:
analyzing said communication history to determine said preferred manner in communicating with said user using natural language processing.

3. The method as recited in claim 1 further comprising:
providing said user an opportunity to replace said user-indicated preferred manner in communicating with said user with said determined preferred manner in communicating with said user in response to said determined preferred manner in communicating with said user not matching said user-indicated preferred manner in communicating with said user.

4. The method as recited in claim 3 further comprising:
updating said user-indicated preferred manner in communicating with said user in said social networking profile of said user with said determined preferred manner in communicating with said user.

5. The method as recited in claim 1 further comprising:
analyzing said communication history to determine said preferred manner in communicating with said user using sentiment analysis.

6. The method as recited in claim 3 further comprising:
determining whether permission has been received from said user to change said user-indicated preferred manner in communicating with said user with said determined preferred manner in communicating with said user.

7. The method as recited in claim 1, wherein said user-indicated preferred manner in communicating with said user comprises one of the following: e-mailing, instant messaging and a phone call, wherein said determined preferred manner in communicating with said user comprises one of the following: e-mailing, instant messaging and a phone call.

* * * * *